United States Patent
Kim et al.

[11] Patent Number: 5,978,432
[45] Date of Patent: Nov. 2, 1999

[54] DISPERSION FUEL WITH SPHERICAL URANIUM ALLOY, AND THE FUEL FABRICATION PROCESS

[75] Inventors: Chang-Kyu Kim; Ki-Hwan Kim; Se-Jung Jang; Eng-Soo Kim; Il-Hyun Kuk; Dong-Seong Sohn, all of Daejeon-Si, Rep. of Korea

[73] Assignee: Korea Atomic Energy Research Institute, Daejeon-Si, Rep. of Korea

[21] Appl. No.: 09/135,819

[22] Filed: Aug. 18, 1998

[30] Foreign Application Priority Data

Apr. 17, 1998 [KR] Rep. of Korea ........................ 98-13783

[51] Int. Cl.$^6$ ....................................................... G21C 3/60
[52] U.S. Cl. ........................... 376/261; 376/411; 376/901; 264/0.5

[58] Field of Search ..................................... 376/260, 261, 376/411, 901; 264/0.5; 252/636, 640

[56] References Cited

U.S. PATENT DOCUMENTS 3,343,947 9/1967 Fizzotti et al. ........................ 376/901

*Primary Examiner*—Daniel D. Wasil
*Attorney, Agent, or Firm*—Nikaido Marmelstein Murray & Oram, LLP.

[57] ABSTRACT

The invention is directed to a high-density dispersion nuclear fuel having spherical particles of an uranium alloy dispersed in a nonfissionable matrix. The alloy includes uranium and 4–9 wt % Q, wherein Q is selected from the group consisting of Mo, Nb, and Zr. A process of manufacturing the spherical particles is also disclosed.

2 Claims, 2 Drawing Sheets

DISPERSION FUEL WITH SPHERICAL URANIUM ALLOY, AND THE FUEL FABRICATION PROCESS

This invention is directed to high-density dispersion fuel having spherical particles solidified rapidly by an atomization process. It more particularly refers to a novel method of making dispersion fuel.

BACKGROUND OF THE INVENTION

Conventionally powder for dispersion nuclear fuel is produced by alloying and comminution. Alloying metals are alloyed into ingots by induction or arc heating in a vacuum atmosphere. The as-cast ingots are heat-treated in a vacuum for 100 hours at 900° C. to ensure compositional homogeneity, and then quenched to form a meta-stable gamma phase. The ingots are machined into chips and milled under liquid argon using a hardened steel mill to obtain the appropriate particle size. The chips of uranium alloys are very pyrophoric due to its high oxidative characteristics. Thus, it is necessary to machine under a sufficient amount of cutting fluid to substantially prevent oxidation. The fuel powder is contaminated by the cutting fluid. Processes of rinsing with an organic solvent such as acetone etc. and drying under vacuum atmosphere at a high temperature are required. Also, during milling the small particles containing ferrous impurities are introduced by the wear of milling machine parts. A close-up of the particle surface reveals many dark spots on the surface which energy dispersive spectroscopy has determined to be iron-rich. Most of the particles containing ferrous components are removed by magnetic separation.

As it is difficult to comminute uranium alloy ingots due to its tough property, the yield of uranium alloy through a mechanical powdering process, which consists of many steps of chipping, milling, rinsing, and drying, is very low, in the range of 5 to 20%. In addition, during magnetic separation about 30% of fuel powder is lost because separated powder contains a considerable amount of fuel particles.

In the case of directly making powder having a particle size from alloy ingots using a high speed lathe equipped with a rotary file, the productivity of usable powder is very low, as it yields 12 grams per hour. The yield of powder smaller than 212 $\mu$m ranges from 32~63% of the total powder, depending on the alloy composition. The powder is produced by grinding ingots with a tungsten/tantalum carbide tool rotating at approximately 2,500 rpm. This process has the drawback of carbide and nitride contamination in the powder due to the wear of the rotary file. Contamination levels range from 0.1~7.6% and are generally higher for uranium alloys with larger alloy contents.

The comminuted particles with longish and irregular shapes, arranged along the rolling or extruding direction perpendicular to heat flow, inhibit thermal conduction in fuel meat. The large specific surface area of these irregular particles enhances the interaction between the fuel particles and an Al matrix to form uranium-aluminide ($UAl_x$) with low-density around the perimeter of the uranium alloy particles, with the consequence of thermal swelling of the nuclear fuel meats.

SUMMARY OF THE INVENTION

This invention is concerned with dispersion fuels having atomized spherical particles and fuel fabrication processes related thereto. Spherical particles of (1) uranium and about 4–9 wt % Q alloys and (2) uranium, about 4–9 wt % Q and about 0.1–4 wt % X alloys wherein (Q is selected from Mo, Nb, and Zr; X is selected from Mo, Nb, Zr, Ru, Pt, Si, Ir, Pd, W and Ta, with proviso that; Q≠X); are directly obtained from alloy melt through the rapid cooling by an atomization method. A homogenization treatment and a mechanical comminution of alloy ingots are not required. An investigation has been carried out for applying this atomization process to the development of high-density dispersion fuels. Many kinds of advantages have been obtained for exanple: 1) direct formation of meta-stable γ-U phase, 2) process simplification, 3) minimization of fabrication space, 4) improvements to uranium yield, fuel productivity, powder purity, and fuel formability, 5) higher thermal conductivity in the real heat flow direction, 6) the decrease of as-fabricated porosity, and a smaller thermal swelling. The invention is directed to the particles themselves, and the dispersion furls containing the particles.

* Captions for the major parts of this drawing

| | |
|---|---|
| (1) Crucible | (2) High-frequency generator |
| (3) Chamber | (4) Vacuum pump system |
| (5) Gas supply valve | (6) Check valve |
| (7) Rotating disk | (8) Recovery container |
| (9) Cyclone | (10) Cooling gas |
| (11) Orifice | (13) Stopper |
| (31) Gas injection nozzle | (32) Chamber wall |
| (71) Electric motor | (100) Centrifugal atomizer |

DETAILED DESCRIPTION OF THIS INVENTION

This invention comprises high-density dispersion fuels containing atomized spherical particles, and fuel fabrication processer related thereto. Comparing with the conventional method, the invention has many advantages for the direct formation of meta-stable γ-U phase, process simplification, the minimization of fabrication space, improvements of production yield, fuel productivity, powder purity and fuel formability, a higher thermal conductivity in real heat flow direction, the decrease of as-fabricated porosity, and a smaller thermal swelling.

A preferred manufacturing method is as follows.

Uranium and alloying metals are charged in a heat-resistant crucible having a stopper and a small orifice. The atomizer chamber is evacuated up to the vacuum degree of above $10^{-3}$ torr using vacuum pumps. Uranium and alloying metals charged in the crucible are melted by vacuum induction or arc heating. The alloy melt is fed through a nozzle onto a rotating disk. Then melt droplets are formed and spread by the centrifugal force of rotating disk. The flying fine droplets are cooled rapidly (above $10^{4°}$ C./sec in cooling rate) in an inert atmosphere of argon or helium gas due to the large specific surface area. The particles may thereafter be dispersed in a nonfissionable matrix (for example, an aluminum (Al) matrix), is desired.

Figure 1:
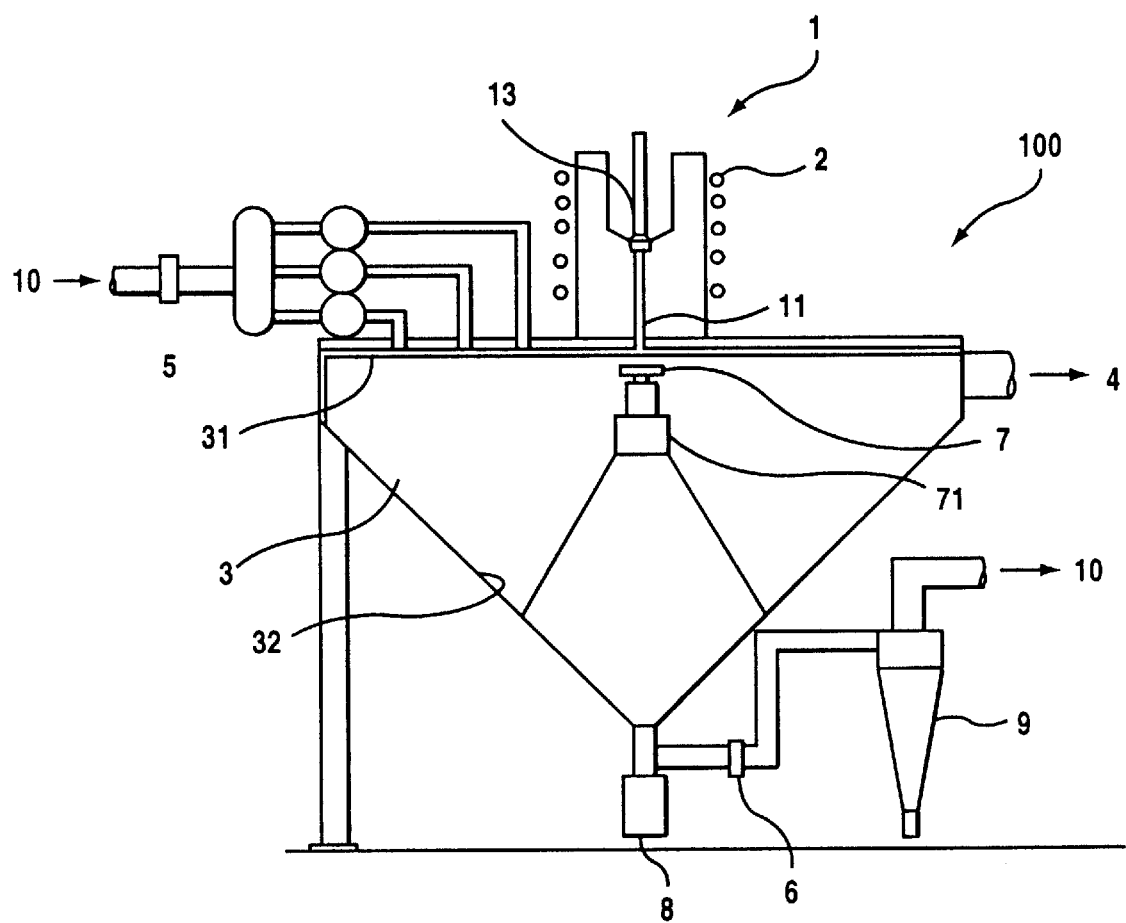
FIG. 1 is a schematic diagram of a centrifugal atomizer.
Figure 2:
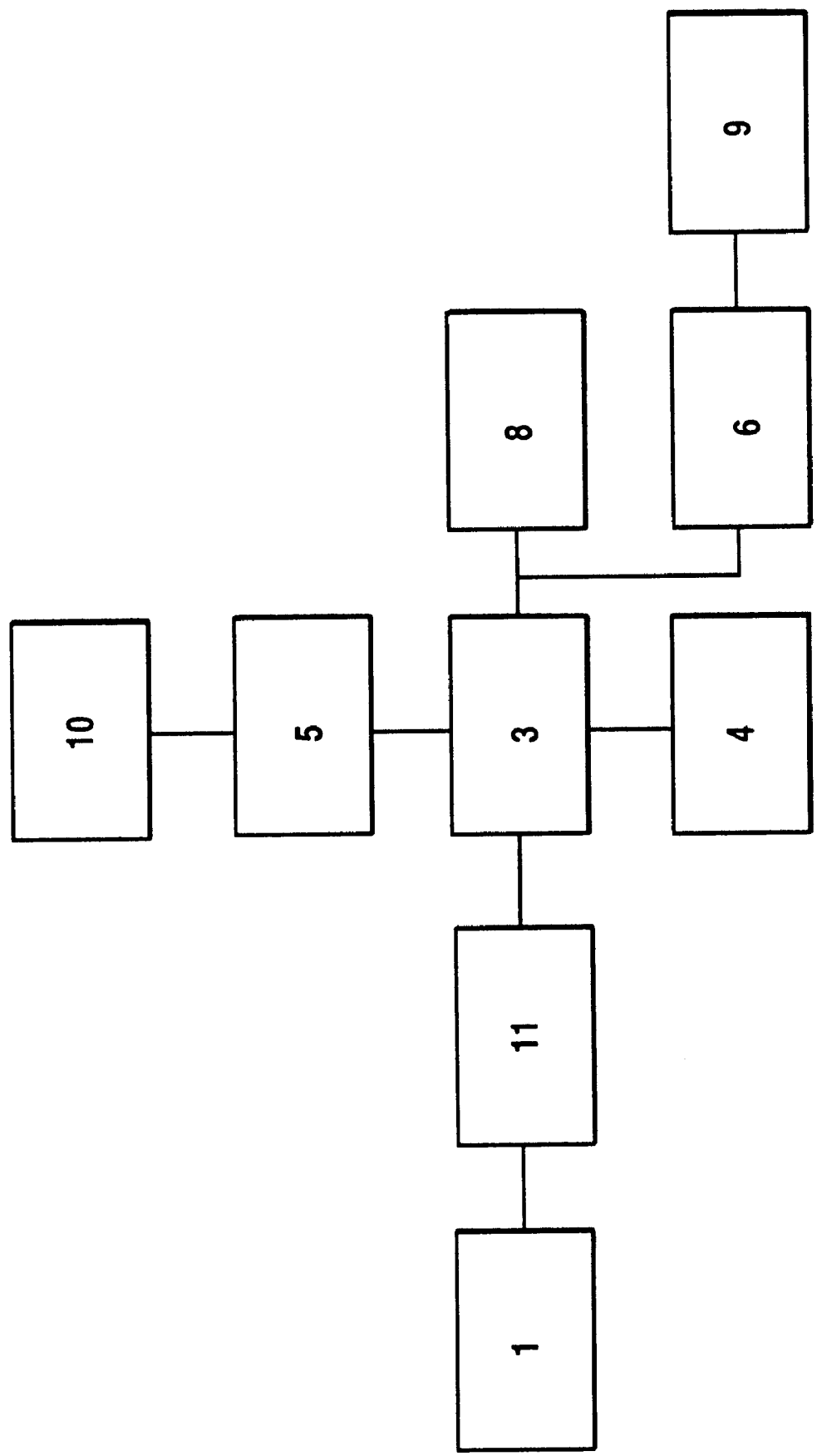
FIG. 2 is a block diagram of this invention.

FIG. 1. shows a schematic diagram of the centrifugal atomizer, and FIG. 2 shows a block diagram of this invention. The equipment of this invention is composed of the heat-resistant crucible (1) having a stopper and an orifice (11), the high-frequency generator (2) for heating the crucible, the vacuum pump system (4) evacuating the chamber (3) to a proper vacuum degree, the gas supply valve (5) providing with the cooling gas (10) in the chamber (3), the check valve (6) discharging the over-pressurized gas outside the chamber, the rotating disk (7), the container (8) collecting the produced powder, and the cyclone (9) collecting the very fine powder.

The crucible (1) is located in the chamber and surrounded by induction coil. Alloying metals are charged in the crucible. The chamber is evacuated up to about $10^{-3}$ torr by a vacuum pump system. The crucible is heated by an induction method. High frequency electric power is supplied to the coil from a generator. The melt is discharged by lifting the stopper and fed through the orifice onto the rotating disk. At the same time the cooling gas of Ar or He is supplied in a downward direction from the nozzles at the middle chamber. The flow rate of the cooling gas is controlled by adjusting valves. The melt is spread with forming droplets by the centrifugal force of the rotating disk. The flying melt droplets are rapidly solidified by cooling gas due to a large specific surface area. The solidified particles slide along the inclined wall of the chamber (3) into the powder container (8) at the bottom of the chamber (3). The check valve (6) located between the cyclone and the chamber discharges the used cooling gas (10) by the over-pressure of the chamber.

This invention is explained as the following example (I). In the case of preparing an alloy powder containing uranium and 8 wt. % Mo, uranium and Mo metal are weighed in proportion to the alloy composition and charged into a crucible. The crucible (1) and insulation are assembled properly. The atomizer chamber is evacuated up to about $10^{-3}$ torr using a vacuum system. Then the crucible is heated by switching on the generator. When the crucible temperature reaches 200° C. higher than the melting point, the disk (7) is rotated to about 30,000 rpm using an electric motor (71). By lifting the stopper the melt is poured on rotating disk though an orifice. The melt is spread by the centrifugal force of the rotating disk, and forms fine droplets, which fly through the downward injecting cooling gas toward the wall of the chamber. The fine droplets are rapidly solidified into the meta-stable γ-U phase at a cooling rate of about $10^{4o}$ C./sec. The atomized powder is collected in the container (8) at the bottom of the chamber (3). The median particle size is about 65 μm, and the portion of powder below 125 μm in size is about 95%. Then the atomized powder is blended with aluminum powder and compacted into pellets. The pellets are preheated at 420° C. and extruded into fuel meats in an inert atmosphere.

Another example (II) is as follows, where spherical particles of uranium, about 4–9 wt % Q and about 0.1–4 wt % X are made (wherein Q is selected from Mo, Nb and Zr; X is selected from Mo, Nb, Zr, Ru, Pt, Si, Ir, Pd, W and Ta, with the proviso that Q≠X.) Other alloys such as uranium and about 4–9 wt % Q can also be made using the process described herein. In the case of preparing an alloy powder containing uranium, 5 wt % Mo and 2 wt % Ir, U, Mo and Ir element are weighed in proportion to the alloy composition and charged in a ceramic crucible. Thereafter the atomizer chamber is evacuated up to above $10^{-3}$ torr using a vacuum pump system in the same way as the atomization process described previously. After the alloy melt is superheated to about 200° C. higher than the melting point, the rotation of disk is started and increased to about 30,000 rpm. The fuel particles are produced with rapid solidification effect (a cooling rate of above $10^{4o}$ C./sec in an inert atmosphere (10). Spherical alloy powder of 30~55% in volume percentage is blended with aluminum powder, and then compacted into billets. The billets are preheated at 370° C., and extruded in an inert atmosphere into a fuel meat.

In this invention, uranium alloy powders are obtained directly from the melt. The followings are the merits obtained by this technology.

First, the powder fabrication by atomization method is excellent in yield and productivity. The fabrication processes such as mechanical comminution of ingots, rinsing and drying chips for the removal of cutting fluid components, and magnetic separation can be eliminated.

Second, the gamma phase of uranium alloy is formed directly from the melt by the rapid cooling effect.

Third, atomized particles have a spherical shape, which gives many kinds of beneficial effects on fuel performance such as: a smaller interaction swelling between fuel particles and matrix, a better thermal conductivity in the real heat flow direction, and improving the formability of fuel meat.

Fourth, the powder quality is pure because there are no chances for contamination from the cutting fluid and grinding tools.

What is claimed is:

1. A dispersion fuel, comprising 30–55 vol % of spherical particles of an alloy dispersed in a nonfissionable matrix, wherein the alloy is selected from the group consisting of (1) uranium and 4–9 wt % Q and (2) uranium, 4–9 wt % Q and 0.1–4 wt % X, wherein Q is selected from the group consisting of Mo, Nb and Zr; and X is selected from the group consisting of Mo, Nb, Zr, Ru, Pt, Si, Ir, Pd, W and Ta, with the proviso that Q≠X, and the uranium is present in a meta-stable γ-U phase.

2. A process of manufacturing spherical particles of an alloy selected from the group consisting of (1) uranium and 4–9 wt % Q and (2) uranium, 4–9 wt % Q and 0.1–4 wt % X, wherein Q is selected from the group consisting of Mo, Nb and Zr; and X is selected from the group consisting of Mo, Nb, Zr, Ru, Pt, Si, Ir, Pd, W and Ta, with the proviso that Q≠X, the process comprising providing uranium and alloying metals Q and optionally X in an atomizing chamber having a vacuum above $10^{-3}$ torr;

melting the uranium and the alloying metals to produce an alloy melt;

forming melt droplets of the alloy melt; and cooling the melt droplets at a cooling rate of above $10^{4o}$ C./sec to produce spherical particles of the alloy.

\* \* \* \* \*